(12) United States Patent
Slatosch et al.

(10) Patent No.: US 7,300,024 B2
(45) Date of Patent: Nov. 27, 2007

(54) DISPLAY MODULE FOR NON-STABLE ENVIRONMENTS

(75) Inventors: Gregor Slatosch, Straubenhardt (DE); Wolfgang Alexy, Pforzheim Hohenwart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 90 days.

(21) Appl. No.: 10/892,900

(22) Filed: Jul. 16, 2004

(65) Prior Publication Data

US 2005/0067536 A1    Mar. 31, 2005

(30) Foreign Application Priority Data

Jul. 17, 2003    (EP)    .................................. 03015661

(51) Int. Cl.
*G12B 9/00* (2006.01)
*A47G 29/00* (2006.01)

(52) U.S. Cl. ..................... 248/27.1; 248/371; 248/919; 361/681

(58) Field of Classification Search ............... 248/27.1, 248/349.1, 131, 371, 919
See application file for complete search history.

(56) References Cited

U.S. PATENT DOCUMENTS

| | | | | |
|---|---|---|---|---|
| 4,354,654 A | * | 10/1982 | Werner et al. | 248/371 |
| 4,473,206 A | * | 9/1984 | Stillinger | 248/371 |
| 4,589,713 A | * | 5/1986 | Pfuhl et al. | 439/162 |
| 4,591,123 A | * | 5/1986 | Bradshaw et al. | 248/179.1 |
| 4,621,782 A | * | 11/1986 | Carlson et al. | 248/183.3 |
| 4,645,153 A | * | 2/1987 | Granzow et al. | 248/181.2 |
| 5,016,851 A | | 5/1991 | Koskinen et al. | 248/278 |
| 5,145,137 A | * | 9/1992 | Choi | 248/288.51 |
| 5,657,956 A | * | 8/1997 | Smith et al. | 248/371 |
| 6,113,047 A | | 9/2000 | Wung et al. | 248/284.1 |
| 6,273,389 B1 | * | 8/2001 | Carlgren | 248/371 |
| 6,419,055 B1 | * | 7/2002 | Walsh et al. | 188/206 R |
| 6,448,893 B1 | * | 9/2002 | Dobberkau et al. | 340/461 |
| 6,712,326 B2 | * | 3/2004 | Kurimoto et al. | 248/349.1 |

FOREIGN PATENT DOCUMENTS

DE    297 06 838 U 1    9/1997
GB    2 273 955 A    7/1994

OTHER PUBLICATIONS

European Patent Office Search Report regarding Application No. EP 03 01 5661, dated Apr. 21, 2004, 7 pages.

* cited by examiner

*Primary Examiner*—Anita M. King
(74) *Attorney, Agent, or Firm*—Brinks, Hofer, Gilson, Lione

(57) ABSTRACT

A display module that includes a minimum of free space, and can pivot and remain stable at every pivot angle is presented. The display module generally includes a frame, a display unit, and a bearing. The bearing pivotably mounts the display unit to the frame and includes a first component that is provided with the display unit and a second component that is provided with the frame. One of the first and second components includes a channel, and the other of the first and second components includes at least one protrusion that moves in the channel. The protrusion may include or be arranged along a shape, such as a ring-segment shape. The channel may also include a shape, such as a ring-segment shape.

21 Claims, 5 Drawing Sheets

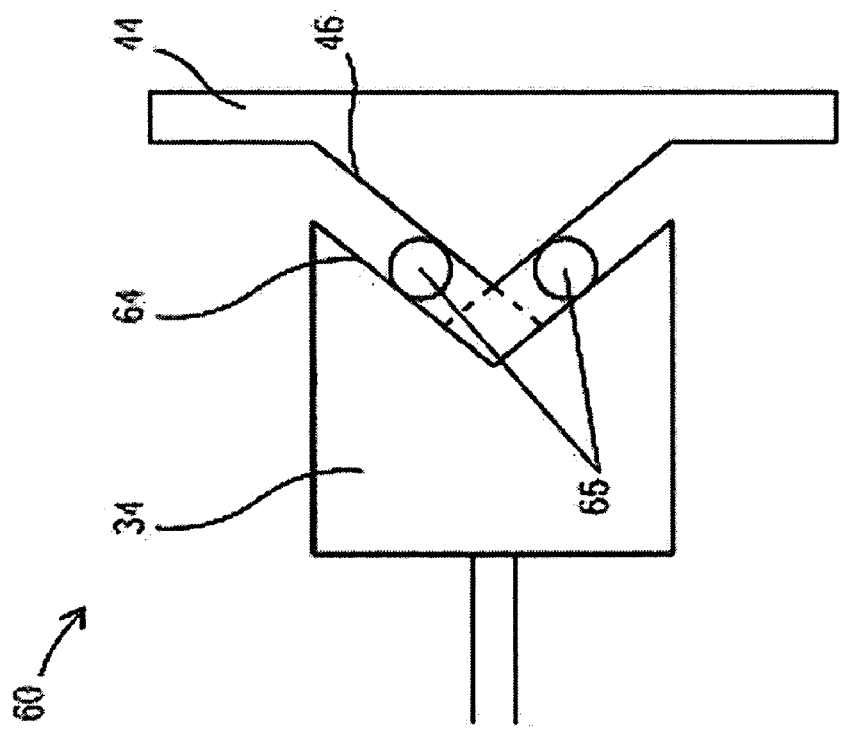
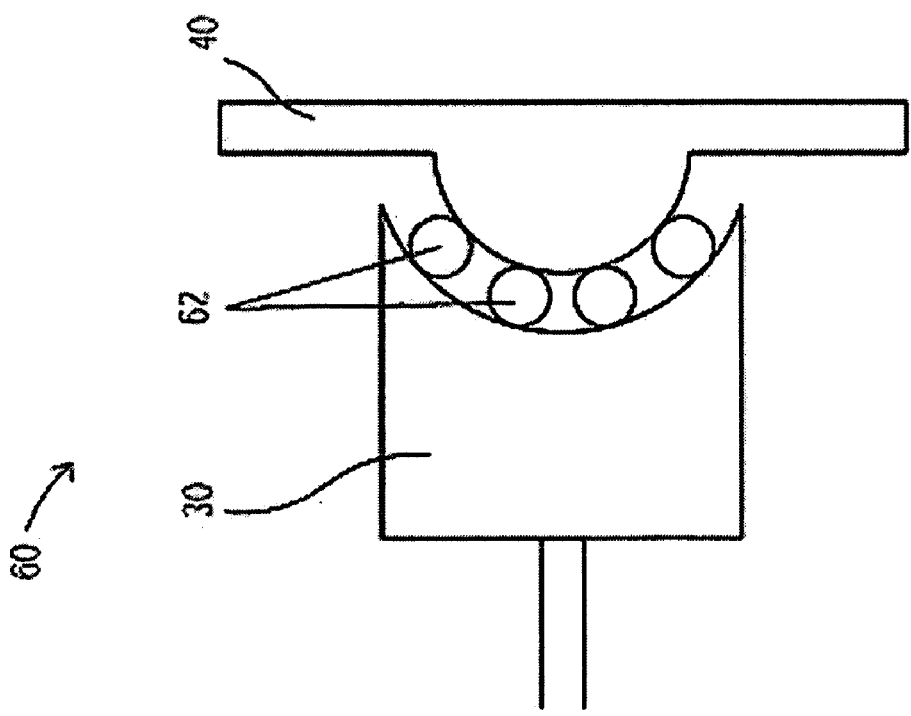

DISPLAY MODULE FOR NON-STABLE ENVIRONMENTS

PRIORITY CLAIM

This application claims priority based on European Patent Application No. 03015661.6, filed Jul. 17, 2003. The disclosure of the above application is incorporated herein by reference.

BACKGROUND OF THE INVENTION

1. Technical Field

The invention relates to a display module, which includes a pivotably mounted display unit that may be mounted in a non-stable environment, such as a vehicle.

2. Related Art

Recently, many vehicles have been equipped with a computer-based system for outputting information to the driver of the vehicle. These computer-based systems may include telematic systems, navigation systems, and/or audio systems. These systems provide the driver or any passengers of the vehicle with many different pieces of information concerning traffic situations, travel information, route guidance, and/or information about a present operating state of the vehicle. In order to accommodate the information provided by computer-based systems, vehicles may include a display module, which include display panels on which information can be shown.

U.S. patent publication U.S. 2001/0042812 A1 discloses an in-dash bracket assembly for pivotably and slidably mounting a display unit to a dashboard in a vehicle. The bracket assembly includes a base and pivot assembly, a support bracket and display mounting hardware. In this arrangement, however, the display unit is not mounted in the dashboard, but only fixed to the dashboard, leaving a poor impression of the design of the interior of the vehicle.

SUMMARY

A display module that can pivot around a pivot axis, be mounted in a non-stable environment, such as the dashboard of a vehicle, and remain stable at every pivot angle, is provided. In addition, this display module minimizes the space required for the pivot movement. Further, the design of the display module is aesthetically pleasant.

The display module may include a frame, a display unit, and a bearing for pivotably mounting the display unit to the frame. The display unit may include a display panel. The bearing may include a first component provided with the display unit and a second component provided with the frame. Either one of these components may include a protrusion, while the other may form a channel in which the protrusion moves. The protrusion may include or be arranged along a shape, such as a ring-segment shape. Alternately, the protrusion may include pins that move in the channel and are arranged along a shape, such as a ring-segment shape. The channel may also include a shape, such as a ring-segment shape. The arrangement of the protrusion and the channel defines a pivot axis for the display unit, which may be chosen in accordance with any limitations placed on the geometry of the frame. This arrangement also allows the display unit to pivot about the pivot axis, and the center of the pivot axis to be positioned very close to the display panel. If the pivot axis is located next to the display panel, the free space surrounding the display unit needed to allow the display unit to pivot is minimized. By minimizing the free space surrounding the display unit, a more pleasant design may be achieved.

One of the components of the bearing may include a concave-shaped element and a convex-shaped element. The protrusion may move between the concave and convex-shaped elements in a channel. The concave-shaped element, the convex-shaped element, and the protrusion, each includes a radius of curvature. The radius of curvature of the concave-shaped element, the convex-shaped element, and the protrusion coincide to define the position of the pivot axis for the display unit. The bearing component that includes the protrusion may be provided with the display unit so that the protrusion forms a mounting bracket on the display unit. In contrast, the bearing component that includes the channel may be provided with the frame. The mounting bracket formed by the protrusion is guided in the channel allowing the display unit to pivot.

The convex-shaped element may be secured to the frame and the concave-shaped element may be arranged in the frame in a radially movable way with respect to the pivot axis. Furthermore, the concave-shaped element may be pushed towards the convex-shaped element by a resilient device. The resilient device may include at least one spring disk. The number of spring disks used may be chosen to easily control the resultant force pushing the concave-shaped element towards the convex-shaped element so that the display unit stays in a desired position (pivot angle). Furthermore, the concave-shaped element may include, on the side opposite its concave-shaped surface, an extension. The extension may be guided in an aperture of the frame and may form an elongated bar. The extension guides the radial movement of the concave-shaped element relatively to the frame. The resilient device may be arranged along this extension. Further, the number of resilient devices used may be chosen in accordance with any performance requirements. More resilient devices may be used when a higher pushing force is needed, and fewer resilient devices may be used when a lower resulting force is needed.

This arrangement sets the display unit at every pivot angle, which means that the display unit can be arranged at every position relative to the frame. The resilient device generates a force from the posterior side of the display module to the anterior side of the display module. This force pushes the concave-shaped element, and therefore the protrusion, in the direction of the convex-shaped element. Because the convex-shaped element is fixed to the frame, the convex-shaped element halts the movement of the concave-shaped element. To halt the pivotal movement of the display unit, the convex-shaped element may also include two stops. Each of these stops defines an end position of the pivoting movement of the display unit. The maximum angles of the pivoting movement are defined by two abutments at each end of the convex-shaped element's convex-shaped surface.

If used in certain environments, such as in a vehicle, the display module may be exposed to vibrations. The display unit keeps a steady pivot angle even in non-stable environments, such as those that include vibrations. In the display unit, the concave-shaped surface of the concave-shaped element and the inner surface of the protrusion are large so that the resulting frictional forces are high enough to hold the display unit in a desired pivot angle. This desired pivot angle may be chosen by a user of the display module. The resilient device is designed so that the force supplied to the concave-shaped element is high enough to keep the protrusion in the channel at every pivot angle. The force needed to stabilize the display unit at any pivot angle will strongly depend on the weight of the display unit. The heavier the display unit, the stronger the force in the anterior direction will need to be. The frictional force provided by the two bearing surfaces may be increased if the protrusion is arranged on each lateral side of the display unit together with the other components of the bearing. This arrangement also allows the display unit to be attached to the frame at two different locations.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 5 shows a bearing that may be used in the display module of FIG. 3.

FIG. 6 shows another bearing that may be used in the display module of FIG. 3.

DETAILED DESCRIPTION OF THE PREFERRED EMBODIMENTS

FIGS. 1 through 4 show an example of a display module 1, which may pivot around a pivot axis, and retain a pivotable position even when mounted in a non-stable environment. Non-stable environments include those which have changing or fluctuating characteristics, such as temperature and position. An example of a non-stable environment is a vehicle, because in a vehicle the temperatures may change as well as the vehicle's position in terms of travel and vibration. As shown in FIGS. 1 through 4, the display module 1 generally includes a display unit 10 to which a display panel (not shown) can be mounted on the anterior side of the display module. The display unit 10 includes a frame 20. The frame 20 may be a part of a housing, such as a dashboard of a vehicle and includes an aperture 21.

Figure 2:
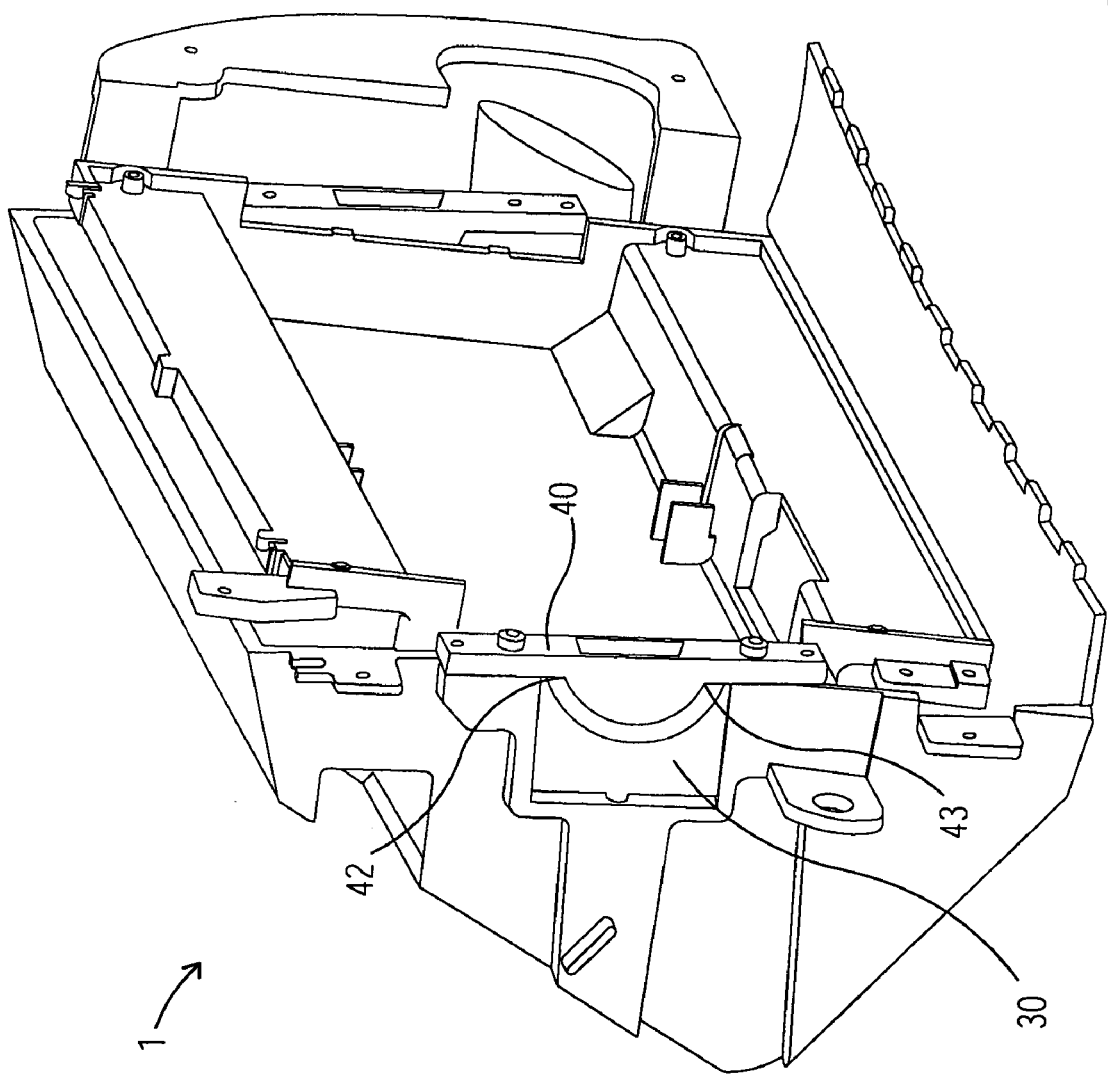
FIG. 2 shows a isometric view of the display module of FIG. 1 in an assembled state.
Figure 3:
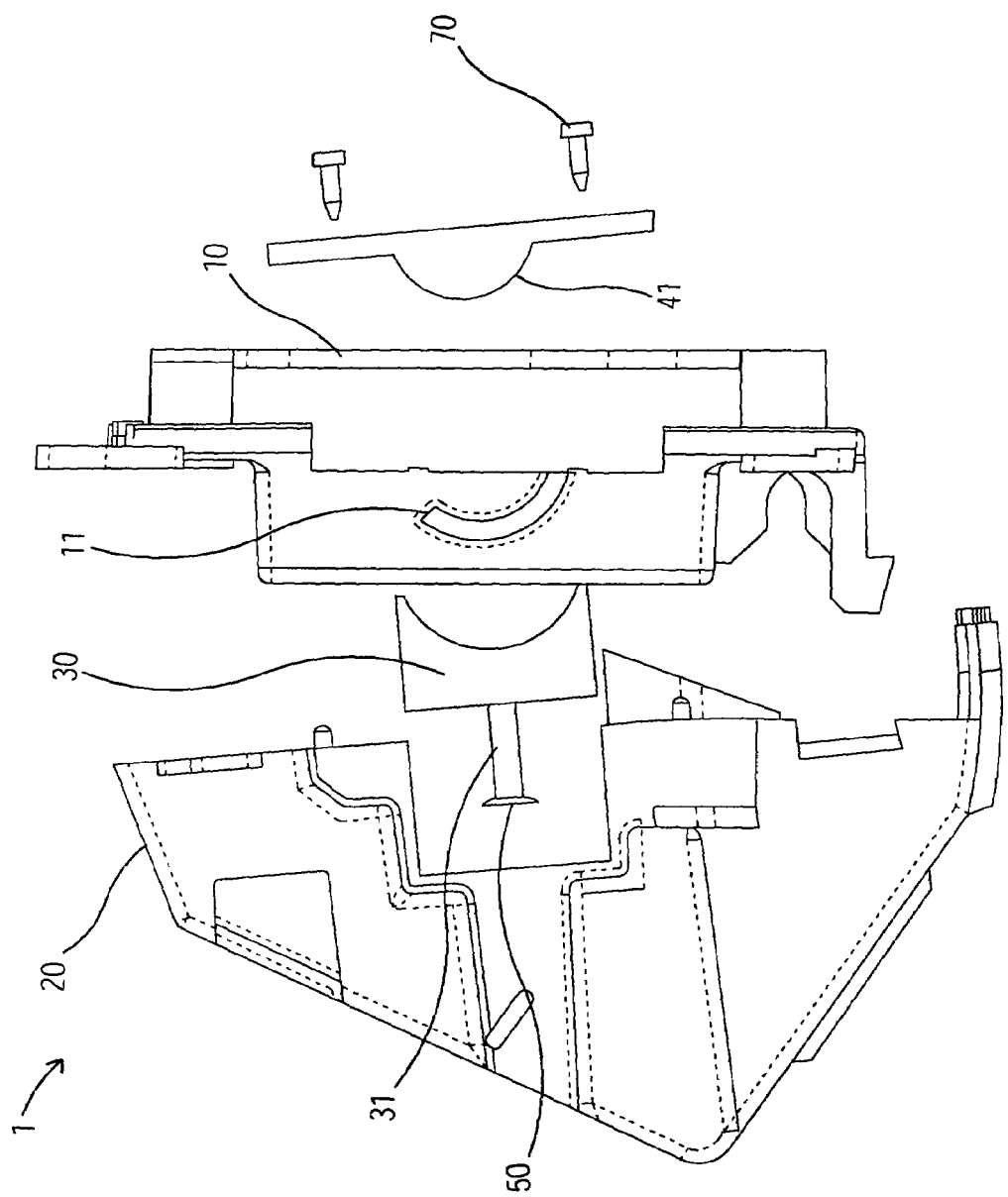
FIG. 3 shows an exploded side elevation view of the display module of FIG. 1.

For the pivotable movement of the display unit 10 a bearing is provided which includes at least three different pieces, a concave-shaped element 30, a convex-shaped element 40, and a protrusion 11. The protrusion 11 forms the first component of the bearing, while the concave-shaped element 30 and the convex-shaped element 40 form the second component of the bearing. The protrusion 11 may be provided on each lateral side of the display unit 10, and may include or be arranged along a shape, such as a ring-segment shape. The protrusion 11 may include a convex-shaped surface 12 and an inner surface 13. The concave-shaped element 30 includes a concave-shaped surface 32, and two stops 42, 43 (FIG. 2). The convex-shaped element 40 includes a convex-shaped surface 41 (FIG. 3).

The display module 1 may be used in an environment in which it will be exposed to large temperature changes and a high level of vibration. For example, the display module 1 may be used in a vehicle in which the temperatures may vary between −40 and +60 or 70° C. when the vehicle is exposed to direct sunlight. A vehicle is any device or structure for transporting persons or things including automobiles, trucks, farming equipment, mining equipment, golf carts, mobile robots, ships, planes, and spacecraft. Therefore, the materials of the display module, particularly those of the bearing, include properties such that, over the entire temperature range of the intended environment, the resulting forces on the protrusion will be high enough so that the protrusion will not change its position when exposed to vibrations.

Figure 1:
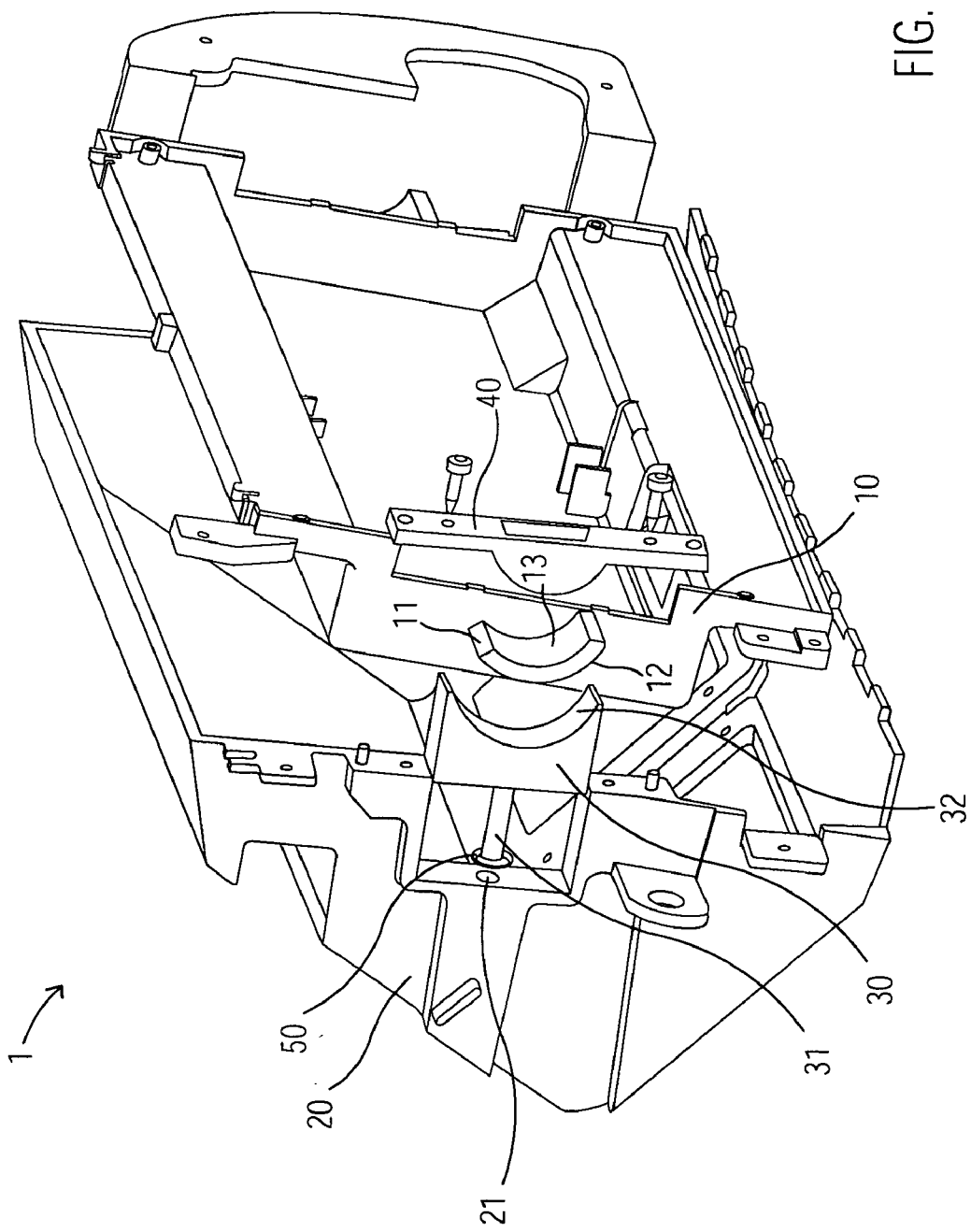
FIG. 1 shows an exploded isometric view of a display module with a pivoting display unit.

As shown in FIG. 1, at the posterior side of the display module, the concave-shaped element 30 includes an extension 31 that is slidably mounted in the aperture 21 of the frame 20. The extension 31 may be formed as an elongated bar. Along the extension 31 a resilient device 50 is provided. The resilient device 50 may include a spring disk, which are generally inexpensive. When the extension 31 is introduced into the aperture 21 of the frame 20, the resilient device 50 pushes the concave-shaped element with its concave-shaped surface 32 in the direction of the convex-shaped element 40. In the display module 1 shown in FIGS. 1, 3 and 4, the resilient device 50 includes only one spring disk. However, the resilient device 50 may include any number of spring disks. The number of spring disks may be chosen in accordance with the force by which the concave-shaped element should be pushed in the anterior direction. For example, a larger number of spring disks will generally be used if a greater force should be used to push the concave-shaped element in the anterior direction.

Figure 4:
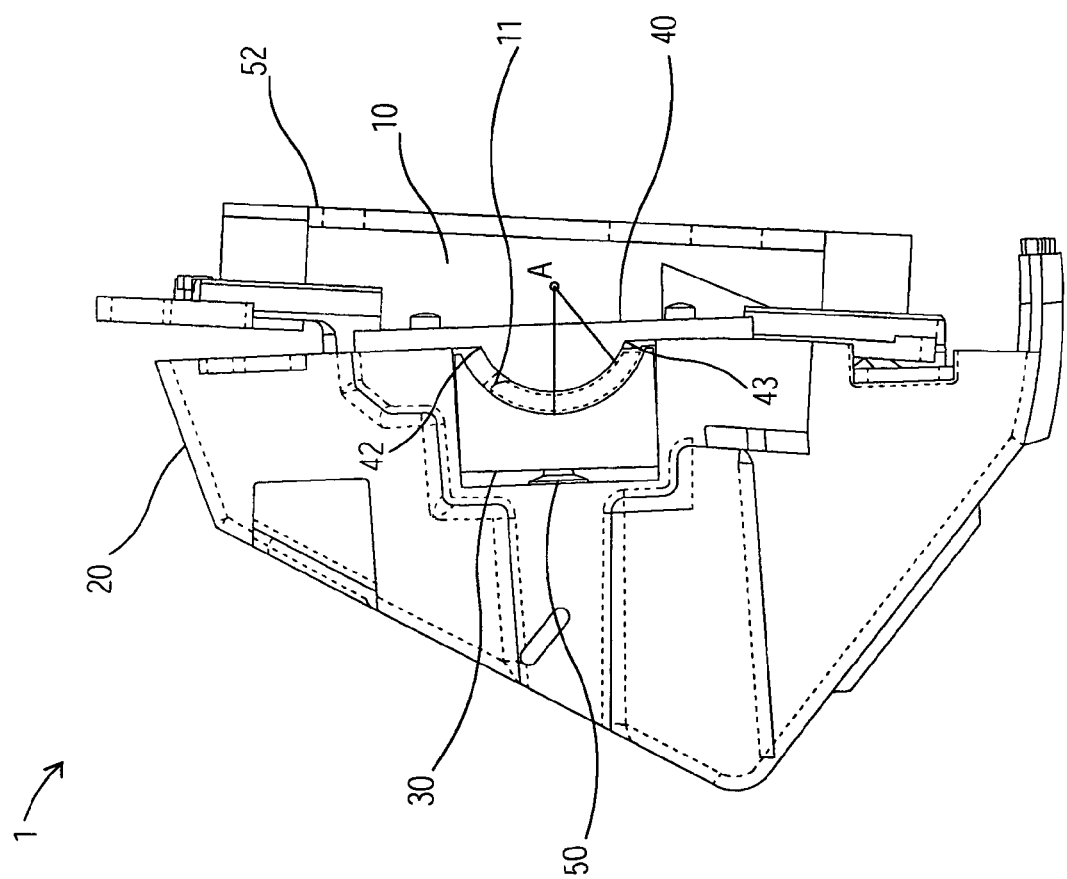
FIG. 4 shows a side elevation view of the display module of FIG. 3 in an assembled state.

As shown in FIGS. 2 and 4, a channel, which may include a shape, such as a ring-segment shape, is formed between the concave-shaped element 30 and the convex-shaped element 40. The protrusion 11 is sandwiched between the concave-shaped element 30 and the convex-shaped element 40, and moves in the channel formed between these two elements. The concave-shaped surface 32 of the concave-shaped element 30 lies on the first convex-shaped surface 12 of the protrusion 11 due to the force applied to the concave-shaped element 30. The second convex-shaped surface 41 of the convex-shaped element 40 contacts the inner surface 13 of the protrusion 11. The convex-shaped element 40 may be fixed to the frame 20 by one or more attachment devices 70 (FIG. 3). As the position of the convex-shaped element 40 is fixed relative to the frame, the force applied by the concave-shaped element 30 to the protrusion 11 and the convex-shaped element 40 is determined by the characteristics of the resilient device.

FIG. 2 shows the display module 1 in an assembled state. The concave-shaped element 30 is pushed in the direction of the convex-shaped element 40 sandwiching the protrusion 11 in between. The pivot angle of the display unit 10 is limited by the two stops 42, 43 of the convex-shaped element 40, which are located on the side facing the concave-shaped element 30. The two stops 42, 43 limit the pivot angle of the display unit 10 by limiting the movement of the protrusion 11, which is shown in FIG. 1. As shown in FIGS. 2 and 4, the angular width of the protrusion and the position of the stops 42, 43 define the extent to which the display unit may be pivoted. In other words, the angular width of the protrusion and the position of the stops 42, 43 define the pivot angle of the display unit 10. The frictional forces among the concave-shaped surface 32 and the first convex-shaped surface 12, the inner surface 13, and the second convex-shaped surface 41 may depend on the area of these surfaces, the resilient characteristics of the resilient device 50, and the materials used to create these surfaces. These parameters may be chosen in accordance with the weight of the display unit 10 and the environment in which the display module is to be used. As shown in FIG. 4, the centers of radii of curvature of the concave-shaped element 30, the convex-shaped element 40, and the protrusion 11 coincide and define a pivot axis A. The pivot axis may be situated behind or on the posterior side of the display panel 52, as shown in FIG. 4.

In some cases, the pivot axis A of the display unit 10 may be located not more than 20 mm behind or in front of the display panel 52. In other cases, the pivot axis A of the display unit 10 may be located not more than 10 mm behind or in front of the display panel 52. In yet further cases, the pivot axis A of the display unit 10 may be located in the plane of the display panel 52. In such circumstances, additional space may not be needed on the upper and the lower sides of the display unit 10. In addition, the pivot axis A may also be situated in front of the display panel 52. This arrangement may be suitable for mounting the display module 10 when the frame 20 is part of the dashboard of a vehicle.

Using these arrangements of the pivot axis A, the space above and below the display unit 10 used for pivoting the display unit 10 can be chosen. The Figures show that the free space needed above and below the display unit 10 may be minimized when the pivot axis A lies within the plane of the display panel 52. By choosing the radius of curvature of the different bearing components, the position of the pivot axis A can be chosen such that it lies in front of, directly in the plane of, or behind the display panel 52.

In FIGS. 5 and 6 additional examples of the bearing used in the display module 1 are shown. In the bearing 60 shown FIG. 5, the concave-shaped element 30 and the convex-shaped element 40 correspond to and have the characteristics of those shown in and explained in connection with FIGS. 1 to 4. However, the protrusion 62 shown in FIG. 5 includes pins that are integrally formed with the display unit 10 along a ring segment and move in the channel formed between the concave-shaped element 30 and the convex-shaped element 40. In this bearing 60, the frictional forces may be less important than for the bearing of FIGS. 1 through 4 because the surfaces of the protrusion 62, the concave-shaped element 30, and the convex-shaped element 40 are in contact with each other over a much smaller area.

In FIG. 6, the concave-shaped element 34 of bearing 60 includes a triangular-shaped concave surface 64, and the convex-shaped element 44 includes a triangular-shaped convex surface 46. The channel between the concave-shaped element 34 and the convex-shaped element 44 may be divided into two separate channels, as indicated by the dashed lines. In this bearing 60, the protrusion 66 may include two pins that move in the channel or channels. Alternatively, the protrusion 66 may include a number of pins greater than two.

In conclusion, a display module is provided that includes a pivotable display unit, which when used within a non-stable environment, such as a strongly-vibrational environment, does not loose its pivotable angle. This means that the display unit stays at every desired pivot angle. Furthermore, the display module may be used in environments with differing geometries because the pivot axis of the display unit may easily be altered by changing the radius of curvature of the bearing components. The pivot axis may, therefore, also be positioned in front of the display panel, if desired. The display module may be incorporated in many different types of frames or dashboards, because the space needed to pivot the display unit is minimized due to position of the pivot axis near the display panel.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A display module, comprising:
   a frame;
   a display unit mounted on the frame;
   a bearing configured to pivotably mount the display unit on the frame and including a first component provided with the display unit and a second component provided with the frame;
   where one of the first and second components includes a ring-segment shaped channel, and the other of the first and second components includes a protrusion configured to move in the channel; and
   where the display unit includes a plurality of lateral sides and the protrusion is arranged on at least one of the plurality of lateral sides.

2. The display module of claim 1, where the frame comprises a part of a dashboard.

3. The display module of claim 1, where the display unit includes a display panel and the bearing further comprises a pivot axis located in front of the display panel.

4. The display module of claim 1, where the display unit includes a display panel and the bearing further comprises a pivot axis located at most about 20 mm from the display panel.

5. The display module of claim 1, where the display unit includes a display panel and the bearing further comprises a pivot axis located at most about 10 mm from the display panel.

6. The display module of claim 1, where the one of the first and the second components including the ring shaped channel is provided with the frame, and the other of the first and the second components including the protrusion is provided with the display unit.

7. The display module of claim 1, where the protrusion includes a ring-segment shape.

8. The display module of claim 1, where the protrusion is arranged along a ring-segment shape.

9. The display module of claim 1, where the one of the first and second components includes a concave-shaped element and a convex-shaped element, the channel being formed between the concave-shaped element and the convex-shaped element.

10. The display module of claim 9, where the protrusion, the concave-shaped element, and the convex-shaped element each include a center of radius of curvature, and the center of radius of curvature of the protrusion, the concave-shaped element, and the convex-shaped element form the basis for a pivot axis for the display unit.

11. The display module of claim 9, where the frame includes an aperture, and the concave-shaped element comprises an extension configured to be guided in the aperture.

12. The display module of claim 9, where the protrusion is sandwiched between the concave-shaped element and the convex-shaped element.

13. The display module of claim 9, where the bearing further comprises a pivot axis and the concave-shaped element is arranged in the frame to be radially movable with respect to the pivot axis.

14. The display module of claim 9, where the concave-shaped element is secured to the frame and includes an extension and a resilient device configured to push the concave-shaped element towards the convex-shaped element.

15. The display module of claim 14, where the resilient device includes at least one spring disk.

16. The display module of claim 14, where the concave-shaped element includes an extension and the resilient device is arranged along the extension.

17. The display module of claim 9, where the convex-shaped element includes a plurality of stops, each defining an end position of a pivot movement of the display unit.

18. A display module, comprising:
 a frame;
 a display unit mounted on the frame;
 a bearing configured to pivotably mount the display unit on the frame and including a first component provided with the display unit and a second component provided with the frame;
 where one of the first and second components includes a ring-segment shaped channel, and the other of the first and second components includes a protrusion configured to move in the channel;
 where the one of the first and second components includes a concave-shaped element and a convex-shaped element, the channel being formed between the concave-shaped element and the convex-shaped element; and
 where the concave-shaped element is secured to the frame and includes an extension and a resilient device configured to push the concave-shaped element towards the convex-shaped element.

19. The display module of claim 18, where the display unit includes a plurality of lateral sides and the protrusion is arranged on one of the plurality of lateral sides.

20. The display module of claim 18, where the resilient device includes at least one spring disk.

21. The display module of claim 18, where the concave-shaped element includes an extension and the resilient device is arranged along the extension.

* * * * *